June 10, 1941.　　　　B. F. WADDELL　　　　2,245,060
TEMPERATURE CONTROL FOR GAS RANGES
Filed Nov. 8, 1937　　　　4 Sheets-Sheet 1

INVENTOR
Benson F. Waddell
BY
Pennie Davis Marvin & Edmonds
ATTORNEYS

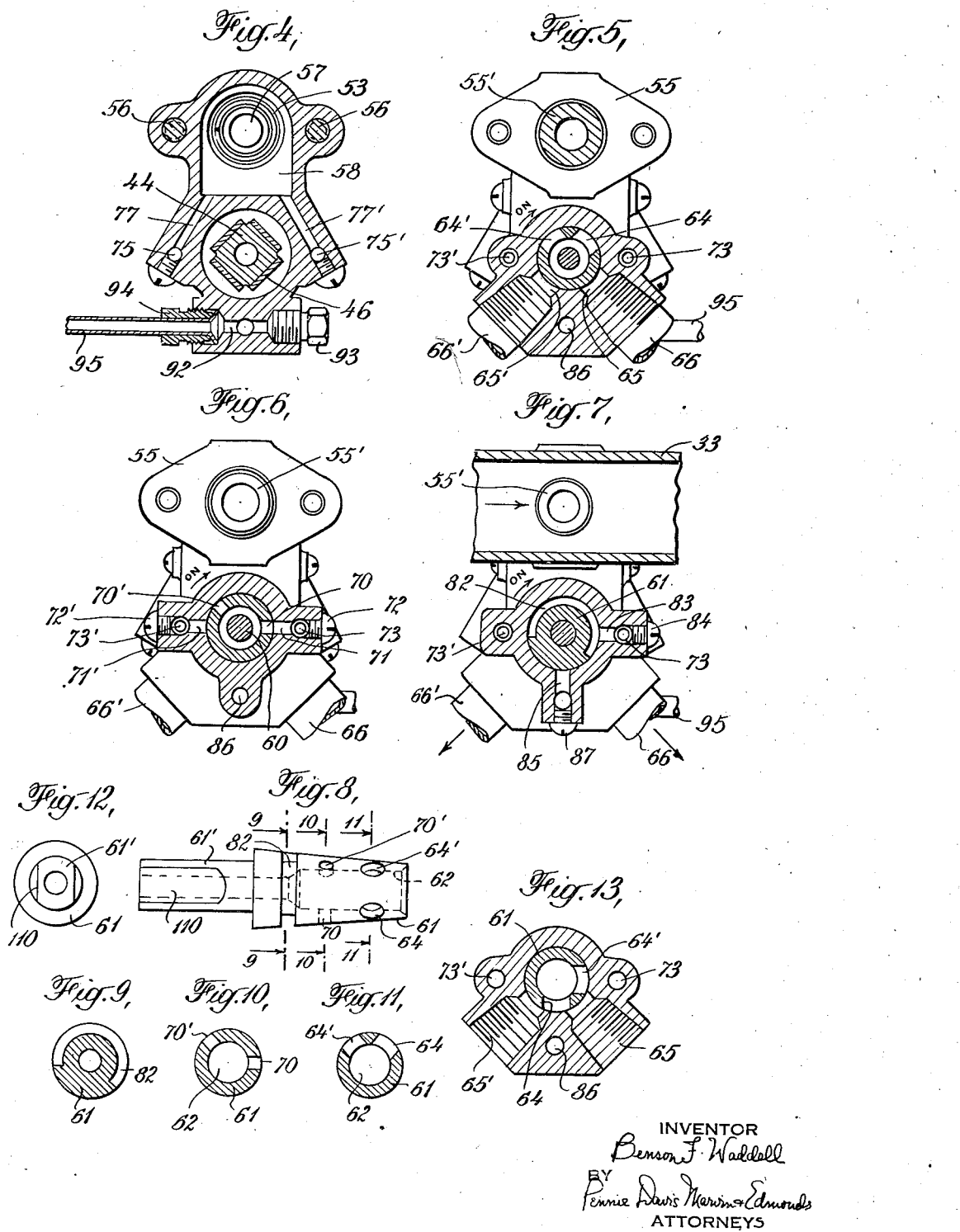

June 10, 1941.  B. F. WADDELL  2,245,060
TEMPERATURE CONTROL FOR GAS RANGES
Filed Nov. 8, 1937   4 Sheets-Sheet 3
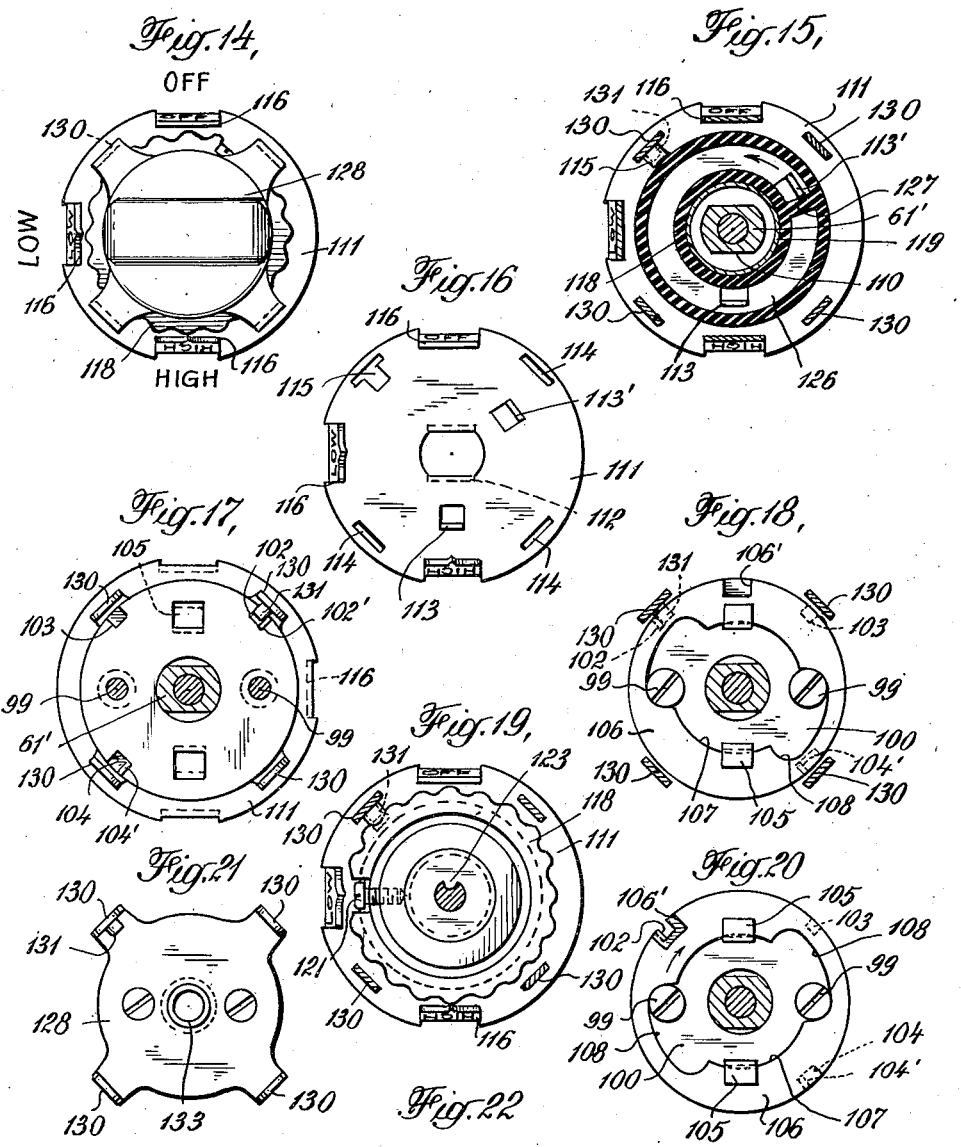

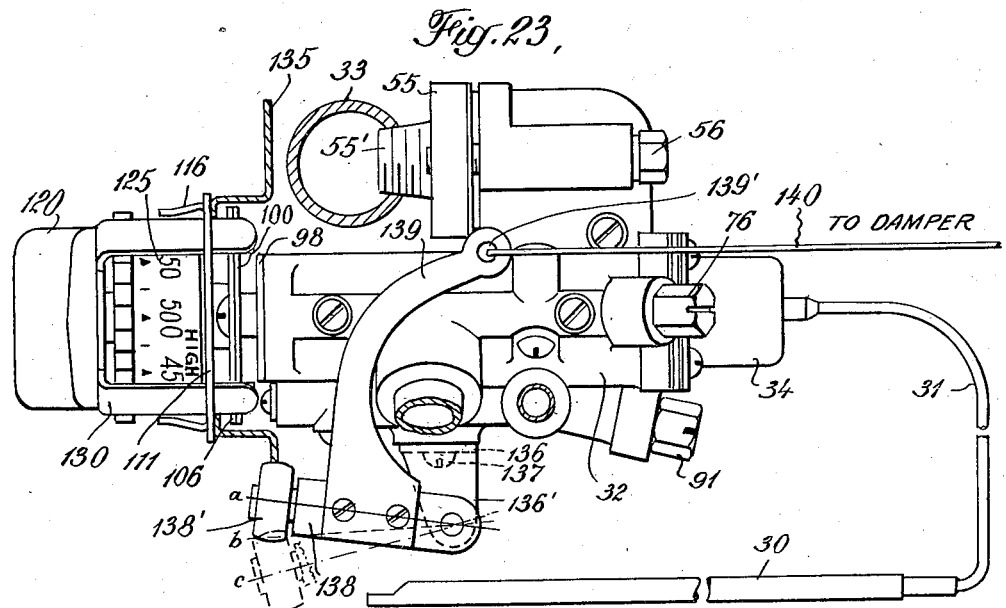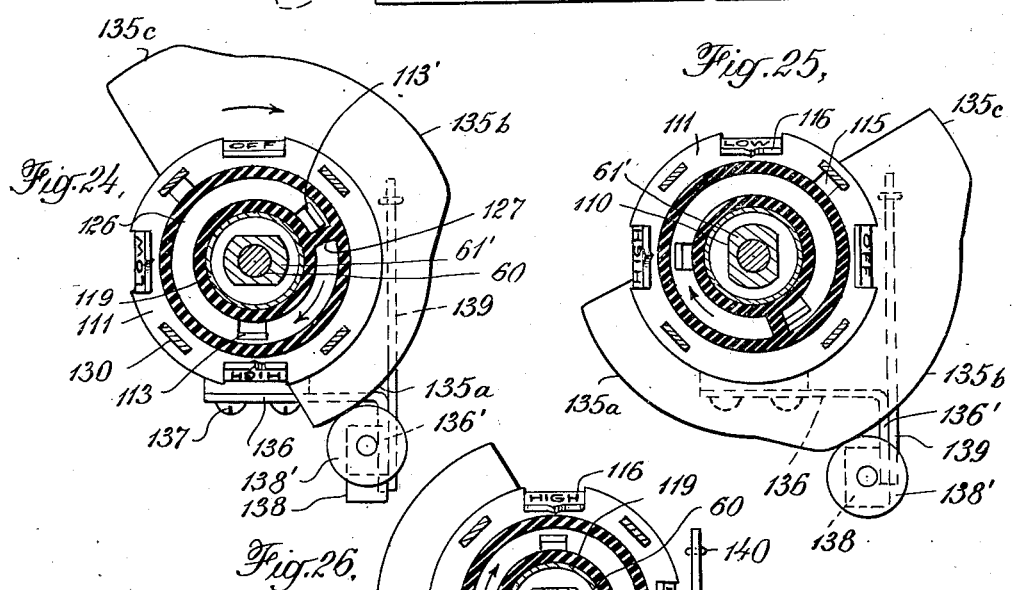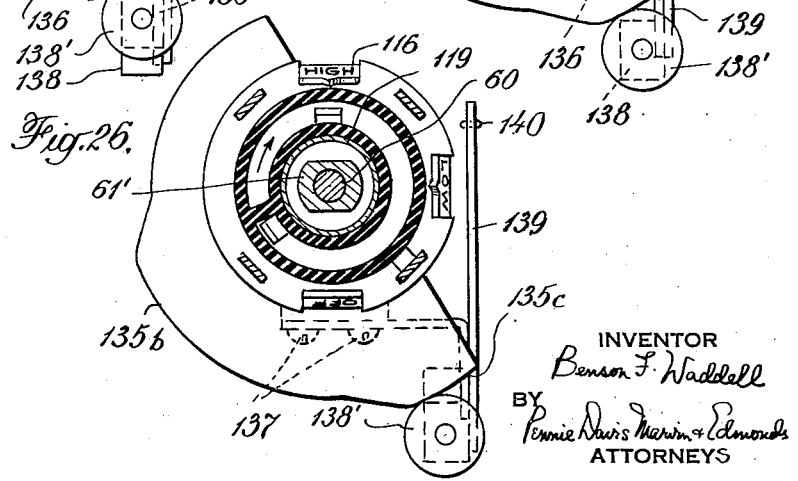

Patented June 10, 1941

2,245,060

UNITED STATES PATENT OFFICE 2,245,060

TEMPERATURE CONTROL FOR GAS RANGES

Benson F. Waddell, Jackson Heights, N. Y., assignor to The Wilcolator Company, Newark, N. J., a corporation of Delaware Application November 8, 1937, Serial No. 173,377

8 Claims. (Cl. 236—15)

This invention relates to regulators for gas ranges and other gas burning appliances of the type employing two or more burners adapted to heat an oven or the like. More particularly, the invention is concerned with a novel regulator for a plurality of gas burners which includes both a thermostatically actuated valve controlling the rate of flow of gas to the burners, and a manually actuated valve by means of which an operator may selectively turn on the gas to one or both of the burners.

It is common in gas ranges to control the temperature in an oven or the like by means of a thermostatically actuated valve responsive to the oven temperature and operable to regulate the flow of gas to the oven burner. It has been proposed heretofore to arrange a by-pass around the thermo-responsive valve permitting a small but constant flow of gas to the burner to provide a minimum maintaining flame, whereby flame extinguishment is prevented when the thermo-responsive valve closes. In these gas ranges as commonly made, the minimum maintaining flame even when made as low as possible consistent with safety is usually too high to permit an oven temperature as low as 250°, which is desirable in some cases, unless the burner is of such a small size or capacity as to sacrifice quick heating to the higher temperatures. This objection to gas ranges of the type referred to has been overcome by providing two burners, either separate burners or two parts of a duplex burner, which are of such size that the by-pass flow to one of them is sufficiently low to maintain the desired low temperature and the combined heating capacity of both together is sufficiently great to permit the desired quick heating to higher temperatures.

The present invention is directed to the provision of novel regulating means for two or more burners which includes in a unitary structure both a thermostatically operated valve for controlling the rate of flow of gas to the burners and a manually operated valve for selectively connecting one or both of the burners to the supply of gas admitted by the thermostatic valve. The new regulator also includes novel by-pass means controlled by the manually operated valve for by-passing gas at a certain rate around the thermostatic valve when only one burner is turned on and for automatically increasing the rate of flow of the by-passed gas when both burners are turned on, so that there is always sufficient by-passed gas to prevent extinguishment of the burner or burners which are turned on. The by-pass means, in addition, is preferably arranged so that an adequate flow of by-passed gas is maintained during the time the manually operated valve is being moved from the position for operating one burner to the position for operating both burners, whereby the burner which is first operated will not be extinguished during actuation of the valve.

Another feature of the new invention resides in the provision of novel means for actuating the manually operated shut-off valve and for effecting regulation of the thermo-responsive valve for temperature adjustment. Preferably, a handle is operatively connected to the shut-off valve and a second handle, such as a dial, similarly connected to the thermo-responsive valve or its operating means, and the two handles are interlocked in axial alignment whereby the position of the handle for the shut-off valve determines the operating limits of the other handle. That is, when the handle for the shut-off valve is moved to the position for connecting only one burner to the gas supply the movement of the adjusting handle for the thermo-responsive valve is confined within limits corresponding to a relatively low temperature range, whereas when the handle for the shut-off valve is moved to the position for connecting both burners to the gas supply the operating range of the handle for the thermo-responsive valve is automatically changed to permit temperature adjustment through a relatively higher temperature range. A suitable scale of temperature graduations is preferably arranged in cooperative relation with the handle or dial for the thermo-responsive valve, whereby the oven temperature corresponding to any given setting may be easily read.

In order to permit operation of the exhaust damper for the oven burners automatically in accordance with the number of burners which are operating at any time, means may be employed for controlling the exhaust damper by the movement of the operating handle for the shut-off valve. To this end, I provide novel mechanism mounted on the casing of the gas regulator and operated by the handle of the shut-off valve for opening the damper a predetermined amount when the shut-off valve is in position to connect one burner to the gas supply, and a greater amount when the shut-off valve is in position to connect both burners to the gas supply, the mechanism operating to close the damper automatically when both burners are cut off from the gas supply.

These and other features of the new regulator will be better understood by reference to the following description taken in connection with the accompanying drawings, in which.

Figure 3:
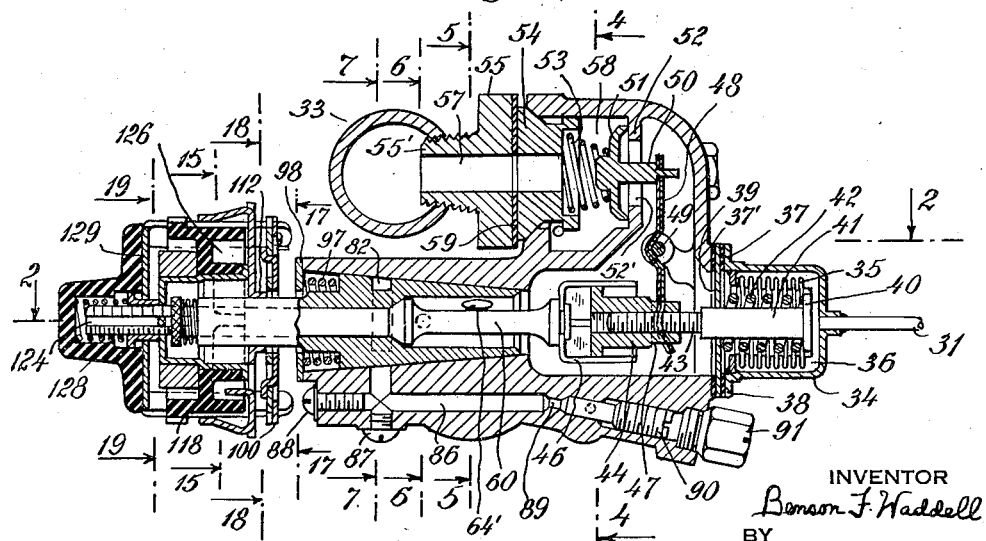
Fig. 3 is a vertical longitudinal section on the line 3—3 of Fig. 2.

Figs. 4, 5, 6 and 7 are sections on the lines 4—4, 5—5, 6—6 and 7—7, respectively, in Fig. 3;

Fig. 8 is a plan view in detail of the manually operated shut-off valve;

Figs. 9, 10 and 11 are sections on the lines 9—9, 10—10 and 11—11, respectively, in Fig. 8;

Fig. 12 is a front end view of the shut-off valve shown in Fig. 8;

Fig. 13 is a detailed view of the same section as Fig. 5, showing the shut-off valve in an intermediate position;

Fig. 14 is a front view of the operating or adjustment handles for the shut-off valve and thermo-responsive valve;

Fig. 15 is a section on the line 15—15 in Fig. 3;

Fig. 16 is a detailed view of part of the interlock mechanism between the two operating handles;

Figs. 17, 18 and 19 are sections on the lines 17—17, 18—18 and 19—19, respectively, in Fig. 3;

Fig. 20 is a view of the same section as Fig. 18 with parts of the mechanism removed, showing the parts in position for disassembling the operating handles;

Fig. 21 is a detailed view of the handle for operating the shut-off valve;

Fig. 22 is a development of the peripheral surface of the handle for adjusting the thermo-responsive valve, showing a scale of temperature graduations thereon;

Fig. 23 is a side view of another form of the new regulator provided with means for controlling the oven damper automatically; and Figs. 24, 25 and 26 are transverse sections of the regulator shown in Fig. 23 illustrating the damper control mechanism in different positions.

The regulator is preferably of the type employing a thermo-responsive liquid contained in a closed system including a bulb located within the oven, a flexible metal tube extending from the bulb to the exterior of the oven, and an expansible and contractable chamber connected to the outer end of the tube. A regulator of this type is described in Patent No. 1,978,362 granted October 23, 1934. It will be understood, however, that the features of the invention may be employed in connection with thermostatic regulators of other types.

Referring to the drawings, the bulb adapted to be mounted in the oven is shown at 30 and the tube leading therefrom at 31. At its outer end, the tube 31 is connected to the regulator casing or a part mounted thereon. The casing, shown at 32, is adapted to be secured as hereinafter described to the manifold 33 of the gas range. The rear portion of the casing 32 includes a main chamber 32', the rear wall of which is provided with an opening over which is secured a cup 34. A flexible metal bellows 35 is sealed within the cup to form an annular space 36 between the cup and the bellows constituting an expansible and contractable chamber. The end of the cup 34 is sealed by a gasket 37 located between a flange 38 on the cup and an annulus 39. A second gasket 37' is interposed between the annulus 39 and the rear end of the casing 32 around the opening therein. A disc 40 lies against the closed end of the bellows, and a rod 41 is secured at one end to the disc and extends inwardly through the central opening in the annulus 39 which serves as a guide for the rod. A spring 42 arranged between the disc 40 and annulus 39 tends to keep the bellows expanded by urging the rod 41 toward the right, as shown in Fig. 3.

Figure 1:
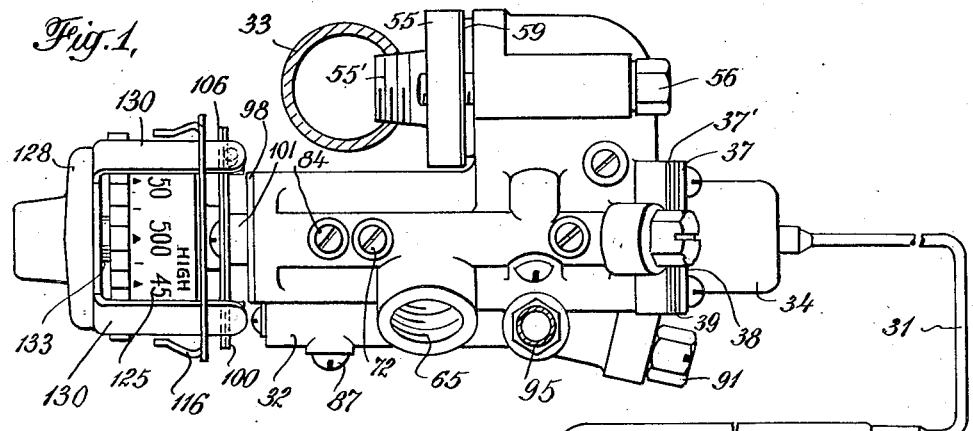
Fig. 1 is a side view of one form of the new regulator.

Beyond the annulus 39, the rod 41 is provided with a threaded portion 43 extending into the main chamber 32' in the casing. A square nut 44 is arranged on the threaded end of the rod, and the flat sides of the nut lie within a square sleeve 46 in closely adjacent relation with the sides of the sleeve. The nut is provided with a reduced end forming a shoulder 47 which is engaged by the lower end of a bi-metallic compensating thermostatic lever 48. The lower end of the thermostatic lever 48 is bifurcated to fit over the reduced portion of the nut 44, the legs of the bifurcated portion of the lever extending downwardly on opposite sides of the reduced portion of the nut. The legs of the bifurcated lever 48 are bent as shown in Fig. 3, and the intermediate portions of the bent legs contact the shoulder 47 on the nut. The lever 48 is pivotally supported intermediate its ends on a pin 49, and beyond the pivot it is connected to the stem 50 of a valve member 51. The valve member 51 is disposed adjacent a valve seat 52 and cooperates therewith to control the passage of gas through an opening 52' formed in the valve seat. The valve member is urged toward its seat by a coil spring 53 which is compressed between the valve member and a valve cap 54 which closes an opening in the casing through which access may be had to the valve. A flange 55 is mounted over the front of the cap 54 by means of bolts 56 which extend through longitudinal openings in the upper part of the casing 32 from the rear end thereof and are received in threaded openings in flange 55 (Figs. 1, 4 and 5). The flange 55 is provided in front with a boss 55' which tapers gradually toward its front end and is externally threaded. The boss 55', flange 55 and cap 54 are provided with aligned openings which together form a passage 57 leading from the end of the boss 55' into chamber 58 on the inlet side of the valve 51. Preferably a gasket 59 is interposed between the face of the cap 54 and the adjacent face of the flange 55.

As shown particularly in Fig. 3, the hollow boss 55' is threaded into an opening formed in the gas supply manifold 33 at the front of the gas range, whereby gas from the manifold 33 is supplied to the inlet side of the valve 51 through the passage 57. The hollow boss 55' is preferably threaded into the supply manifold 33 before the flange 55 which carries the boss is connected to the casing and before the manifold pipe 33 is mounted on the gas range. The installation may be conveniently effected by first threading the boss of the detached flange 55 into the detached manifold pipe 33 and then mounting the manifold pipe on the range and connecting the casing 32 to the flange 55 by means of the bolts 56.

The square sleeve 46 is connected to the inner end of a rod or shaft 60 which projects through the front of the valve casing and carries an operating handle or dial, to be presently described, permitting adjustment of the bimetallic lever 48. The forward portion of the casing 32 through which shaft 60 extends is formed with a conical opening which flares outwardly from the chamber 32' and forms a seat for a rotatable valve member 61 of a shut-off valve. The valve member 61 is of a generally conical shape and is disposed in the casing with the tapered end thereof near the reduced or inner end of the conical seat, whereby the valve member and seat form gas-tight seal. At its tapered end, the valve member 61 is formed with an axial bore 62 communicating with the main chamber 32' in the casing. The shaft 60 extends through the bore 62 and is substantially smaller in diameter than the bore so that an annular space is formed in the valve member 61 around the shaft 60. Beyond the bore 62, the shaft 60 extends through a smaller bore in the valve member 61 coaxial with the bore 62, the shaft fitting snugly in the smaller bore to form a gas-tight seal. Preferably, the shaft 60 intermediate its ends is formed with an enlargement 60' which fits against the tapered front end of bore 62 so as to limit the forward movement of the shaft in the valve 61 and seal the bore 62.

The conical valve member 61 near its rear or tapered end is formed with two circumferentially spaced openings 64 and 64' which extend from the peripheral surface of the valve member to the annular passage in the bore 62. The openings 64, 64' in the valve member are adapted to cooperate with passages 65 and 65' formed in the lower portion of the casing 32. As shown particularly in Fig. 5, the passages 65 and 65' open into the conical seat of the valve 61 and extend outwardly and downwardly therefrom to the outside of the casing. The passages 65, 65' are enlarged at their outer ends and are threaded to receive the ends of pipes 66 and 66', respectively. The pipe 66 leads to one of a pair of burners (not shown) in the oven of the gas range, and the pipe 66' leads to the other burner. When the valve member 61 is in the "off" position, the two passages 65, 65' in the casing are closed by the wall of the valve member, as shown in Fig. 5. When it is desired to operate one of the gas burners, the valve member 61 is rotated in a clockwise direction, as viewed in Fig. 5, until the opening 64 therein is in alignment with the passage 65 in the casing, whereby gas from the main chamber 32' in the casing may pass through the bore 62 and opening 64 in the valve member, passage 65 in the casing, and pipe 66 leading to the burner. When it is desired to operate both of the oven burners, the valve member 61 is rotated further in a clockwise direction, as viewed in Fig. 5, until the opening 64 therein is in alignment with passage 65' in the casing and the opening 64' in the valve member is in alignment with the passage 65 in the casing. In this position of the valve member, the gas may pass from the main chamber 32' through bore 62, openings 64 and 64', passages 65' and 65 aligned therewith, respectively, and pipes 66 and 66' to the respective burners.

Figure 2:
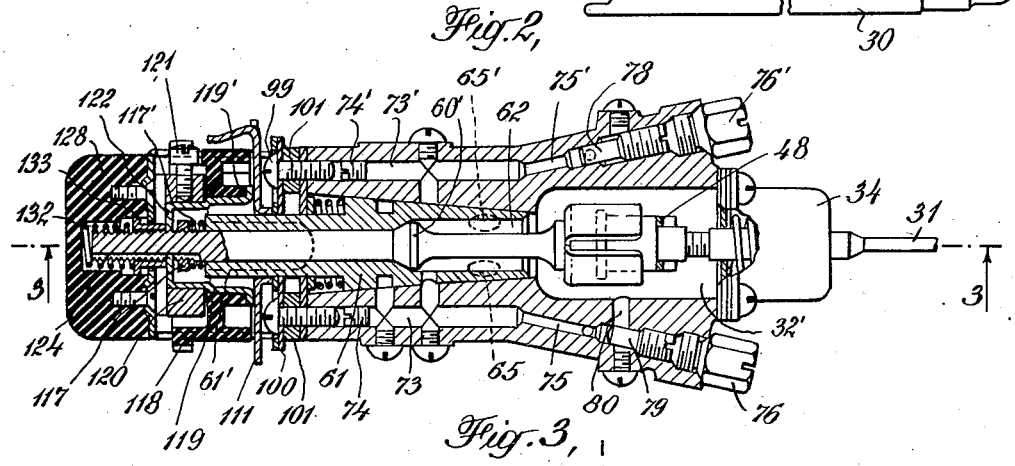
Fig. 2 is a horizontal, longitudinal section on the line 2—2 in Fig. 3.

Beyond the openings 64, 64' and toward the front or enlarged end of the valve seat, the valve member 61 is provided with a pair of circumferentially spaced openings 70 and 70', as shown particularly in Fig. 6. The openings 70, 70' communicate with the bore 62 in the valve member and extend through the wall of the valve member to the conical seat of the casing 32. The openings 70, 70' are adapted to cooperate with horizontal passages 71 and 71' in the casing extending outwardly from the conical seat. The passages 71, 71' may be conveniently made by drilling bores in the casing from opposite sides thereof and closing the outer ends of the bores by screws 72 and 72', respectively, threaded therein. At their outer ends, the passages 71 and 71' communicate with longitudinal passages 73 and 73', respectively, in opposite sides of the casing. The passages 73 and 73' may be conveniently formed by drilling bores in the opposite sides of the casing from the front thereof and closing the front ends of the bores by plugs 74 and 74', respectively, threaded therein (Fig. 2). As shown particularly in Fig. 2, the passages 73 and 73' communicate at their rear ends with smaller passages 75 and 75', respectively, which extend outwardly and rearwardly from the passages 73, 73'. Preferably, the passages 75 and 75' are formed by drilling bores in opposite sides of the casing from the rear end thereof. The passages 75 and 75' toward the rear of the casing are closed by plugs 76 and 76', respectively, which are threaded into the passages and cover adjusting screws 79 and 78, respectively.

Passages 77 and 77' (Fig. 4) are formed in the walls of the casing on opposite sides of the main chamber 32', and these passages extend downwardly and outwardly from the chamber 58 on the inlet side of valve 51 and communicate at their lower ends with the passages 75 and 75', respectively. Accordingly, the passages 73, 75 and 73', 75' are supplied with gas from the manifold 33, passage 57, chamber 58, and passages 77 and 77', respectively, even when the valve 51 is closed. As shown in Fig. 2, the adjusting screw 78 is provided at its inner end with an extension disposed near the lower end of passage 77', whereby the rate of flow of by-pass gas to the passage 75' may be regulated by adjustment of the screw 78. The adjusting screw 79 is provided with an extension adjacent the outer end of a transverse passage 80 which connects passage 75 with the main chamber 32' in the casing, the screw 79 being adjustable to regulate the rate of flow of by-pass gas from passage 75 through the passage 80 into the main chamber 32'.

It will be observed that the openings 70 and 70' in the valve member 61 are so spaced circumferentially that when the valve 61 is in its "off" position (Fig. 6) the opening 70 is in alignment with passage 71 in the casing and opening 70' extends obliquely upwardly toward the opposite side of the casing. When the valve member 61 is rotated clockwise through an angle of substantially 90°, the opening 64 (Fig. 5) in the valve member will be in alignment with passage 65 in the casing so as to supply one of the burners, and when the valve member is in this position the openings 70 and 70' will be closed by the seat of the valve member, whereby the passages 73 and 73' will be cut off by the valve member from the bore 62. However, when the valve member is rotated clockwise through an additional 90° to connect both of the burners to the interior of the casing through openings 64 and 64', the opening 70 in the valve member will be in alignment with the passage 71' in the casing. With the valve member in this position, by-pass gas from passage 73', 75' will pass into bore 62 through passage 71' and opening 70. As the valve member 61 is moved from the position for connecting one of the burners to the gas supply to the position for connecting both burners thereto, the opening 70' will pass by the passage 71 in the casing and temporarily connect the bore 62 with by-pass passage 73, 75. That is, when the valve member 61 is intermediate the two positions referred to (Fig. 13) so that the portion of the valve member between the openings 64 and 64' is in alignment with passage 65, the opening 70' in the valve member will be in exact alignment with passage 71 in the casing so as to admit additional gas therein.

Beyond the openings 70 and 70' and toward the front of the casing, the valve member 61 is provided with a slot 82 extending circumferentially along its peripheral surface. As shown particularly in Fig. 7, when the valve member is in its "shut-off" position the slot 82 extends around the upper part of the valve member from a point opposite passage 73' in the casing to a point substantially below the opposite passage 73. A horizontal passage 83 extends inwardly from passage 73 in the casing and opens into slot 82 in the valve member. The passage 83 may be conveniently formed by drilling a bore into the casing from the side thereof and closing the outer end of the bore by a screw 84 threaded therein. A second passage 85 is formed in the casing in the same transverse section as the passage 83. The passage 85 extends downwardly from the lower portion of the seat of valve 61 and communicates at its lower end with a longitudinal passage 86. The passages 85 and 86 may be conveniently formed by drilling bores in the casing from the bottom and front thereof, respectively, and closing the ends of the bores by screws 87 and 88, respectively. As shown, particularly in Fig. 3, the passage 86 at its rear end communicates with a smaller passage 89 which extends rearwardly and downwardly from passage 86. The passage 89 is enlarged toward the rear end of the casing to receive an adjusting screw 90 threaded therein. A cap 91 is threaded into the rear end of passage 89 over the adjusting screw 90 and is removable from the passage to permit access to the adjusting screw. As shown particularly in Fig. 4, a transverse passage 92 extends outwardly in opposite directions from passage 89 in the casing. The passage 92 is enlarged at its ends and a stop plug 93 is threaded into the enlarged end of passage 92 at the right hand side of the casing, as seen in Fig. 4. Threaded in the opposite end of passage 92 is a sleeve 94 in which one end of a conduit 95 is fixed. The conduit 95 extends from the sleeve 94 to a pilot burner in the oven (not shown) which is adapted to re-light the oven burners in case they have been accidentally extinguished.

It will be seen by reference to Fig. 7, that when valve member 61 is in its "off" position, the slot 82 therein does not extend to the vertical passage 85 in the casing, and accordingly the longitudinal passage 86, 89 in the casing and the pilot burner (not shown) are cut off from the by-pass passage 73, 75 in the casing. However, when the valve member 61 is rotated clockwise from the position shown in Fig. 7 through an angle of 90° to supply one of the burners, or through an angle of 180° to supply both of the burners, the slot 82 therein will extend between the transverse passage 83 and vertical passage 85 in the casing, whereby gas will be supplied from passage 73 in the casing through passage 83, slot 82, passages 85, 86, 89 and 92, conduit 95 and through the latter to the pilot burner.

The front end of the valve member 61 is in the form of a hollow stem 61' which projects outwardly from the front of the casing. The valve member 61 is retained against its conical seat in the casing by a coil spring 97 which abuts at one end against the shoulder formed by the stem 61' and at its opposite end against a plate 98 mounted over the end of the casing and provided with an opening through which stem 61' extends. The plate 98 is held in position against the front of the casing by bolts 99 which extend through a latch plate 100 and through openings in the plate 98, the ends of the bolts being threaded into the adjacent ends of the longitudinal passages 73 and 73' in the casing. Preferably, spacing washers 101 are interposed between the end plate 98 and latch plate 100. The construction of the latch plate 100 is shown particularly in Figs. 17, 18 and 20. As there shown, the latch plate is of a generally circular shape and is provided with diametrically opposed openings through which the bolts 99 extend. Also, the latch plate 100 is provided with three circumferentially spaced notches 102, 103 and 104 in the periphery thereof. As shown particularly in Fig. 17, the notches 102 and 104 are diametrically opposed and are formed by a stamping operation which provides ears 102' and 104', respectively, extending rearwardly from the plate adjacent the notches. The third notch 103 is intermediate the notches 102 and 104 and does not have an adjacent ear.

The latch plate 100 is struck to form a pair of diametrically opposed lugs or ears 105 which project forwardly from the plate and are bent outwardly against a key plate 106. The key plate 106 is in the form of a disc and lies flat against the front face of latch plate 100, as shown in Figs. 18 and 20. A central opening 107 is formed in the key plate 106 and the central opening has diametrically opposed enlargements 108 in which the heads of bolts 99 are disposed. The ears 105 on the latch plate 100 extend around opposite edges of the central opening 107 in the key plate and lie flat against the front face of the key plate to hold the latter securely in position.

A notch 106' is formed in the periphery of the key plate 106. Normally, the key plate 106 is held on the fixed latch plate 100 in the position shown in Fig. 18. However, the ears 105 on the fixed latch plate permit the key plate 106 to be rotated in a counterclockwise direction from the position shown in Fig. 18, until the notch 106' in the periphery of the key plate is in alignment with notch 102 (Fig. 20) in the latch plate. The purpose of aligning the notch 106' in the key plate with notch 102 in the latch plate will be described in detail presently.

The stem 61' of the valve member 61 is flattened on the top and bottom, as shown at 110, and mounted on the stem is a disc 111 provided with a central opening through which the stem 61' extends. A rearwardly extending flange 112 surrounds the central opening in disc 111 and the opening and flange have flattened portions corresponding to the flattened portions 110 on the stem. Accordingly, rotation of disc 111 will cause rotation of the valve member 61. The construction of the disc 111 is shown in Fig. 16. As there shown, the disc is struck to provide two spaced ears 113 and 113' extending forwardly from the front face of the disc. The disc 111 is further provided with three slots 114 formed near the periphery thereof. As shown in Fig. 16, two of the slots 114 are diametrically opposed, while the third slot lies intermediate the other two slots. Diametrically opposed to the intermediate slot 114 is a fourth slot 115 in the disc near the periphery thereof, the latter slot being similar in shape to the slots 114 except that it is provided with an enlargement, as shown. Along its periphery, the disc 111 is provided with three spaced ears 116 which extend forwardly from the disc. One of the ears 116 is disposed at the top of the casing when valve 61 is positioned to cut off both outlet ports 65 and 65', and this ear bears suitable indicia such as the word "Off." Another of the ears 116 is diametrically opposed to the first ear and appears at the top of the casing only when the valve 61 is rotated 180° to supply both outlet ports 65 and 65'. The latter ear bears appropriate indicia such as the word "High." The third ear 116 lies intermediate the diametrically opposed ears and appears at the top of the casing only when valve 61 is in its intermediate position for supplying only the outlet port 65. This ear has the word "Low" inscribed thereon. The slots 114 and 115 are adapted to receive suitable arms of a handle for rotating the disc 111 and thereby turning valve member 61, as will be described presently.

A nut 117 is arranged on the threaded outer end of shaft 60, and interposed between the nut 117 and the end of the hollow stem 61' of the valve member is a coil spring 117'. It will be apparent that the coil spring 117' normally urges the shaft 60 outwardly with respect to valve member 61, whereby the enlargement 60' on the shaft is maintained in engagement with the tapered front end of the bore 62 in the valve member.

The shaft 60 for adjusting the thermostatic lever 48 is adapted to be rotated by a suitable calibrated dial 118 mounted on a sleeve 119 on the shaft. As shown in Figs. 2 and 3, the rear portion of the sleeve 119 is of such diameter that it fits closely in the bore of the dial 118 and is provided with a flange 119' against which the rear end of the dial abuts. The forward portion of the sleeve 119 is of a smaller diameter and has a collar 120 mounted thereon. The collar 120 is received in a recess in the front end of dial 118, and the dial, sleeve and collar are held against relative movement by an adjusting screw 121 which extends through a slot in the periphery of the dial and is threaded through an opening in the collar into engagement with the sleeve 119. The front end of the sleeve 119 is provided with an inwardly extending circumferential flange 122 which extends closely around the threaded portion of shaft 60. As shown in Figs. 2 and 19, the flange 122 on sleeve 119 is provided with a key 123 extending into a keyway 124 formed in the threaded portion of shaft 60. Accordingly, rotation of the dial 118 will cause rotation of the shaft 60, whereby the position of the square nut 44 and the thermostatic lever 48 in the casing may be adjusted.

On the periphery of dial 118 is a scale of temperature graduations 125, a development of which is shown in Fig. 22. The scale of graduations 125 cooperates with the two ears 116 on disc 111 which bear the words "Low" and "High," these two ears being preferably pointed as shown in Figs. 14 and 16. That is, when either of the latter two ears is moved to the top of the regulator by rotation of disc 111 so as to open one or both of the outlet ports 65, 65', the temperature for which the regulator is set may be read on the scale 125 beneath the point of the ear. Rotation of dial 118 for regulating the thermostatic lever 48 is limited by the forwardly extending ears 113 and 113' on the disc 111. When the parts are in their assembled positions, the ears 113 and 113' extend into a groove 126 formed in the rear face of the dial 118 and are adapted to be engaged by a web 127 extending across the groove 126, the web 127 being disposed between the ears 113 and 113', as shown in Fig. 15. Thus, the dial 118 and disc 111 are interlocked by the ears 113, 113' and web 127 so that the limits through which the dial 118 may be rotated with respect to the top of the casing are determined by the position of disc 111.

The disc 111 is adapted to be rotated by a handle 128 loosely mounted on the outer end of shaft 60. A plate 129 is screwed on to the inner face of the handle 128 and carries four inwardly extending arms 130, as shown in Fig. 21. The arms 130 are spaced from the periphery of dial 118 to permit rotation of the dial relative to the handle 128. One of the arms 130 is provided near its inner end with an inwardly extending lug 131, and this arm extends through the enlarged slot 115 in the disc 111, while the other three arms 130 which do not have lugs thereon extend through the slots 114 in the disc. The arms 130 are held by disc 111 substantially in contact with the periphery of key plate 106 and latch plate 100 (Figs. 17 and 18), and the handle 128 is held against removal from shaft 60 by the key plate 106 which covers the notches 102, 103 and 104 in the latch plate and thereby prevents the passage of lug 131 through these notches. As shown in Figs. 2 and 3, the threaded end of shaft 60 extends into a central bore formed in the handle 128. Arranged in the bore of the handle is a coil spring 132, one end of which is seated against the handle at the end of the bore and the other end of which abuts against the end of a sleeve 133 loosely mounted over shaft 60 in the bore of the handle 128. The other end of the sleeve 133 rests against the flange 122 of sleeve 119. It will be apparent that the coil spring 132 normally urges handle 128 outwardly away from dial 118 so as to maintain the lug 131 on arm 130 in engagement with the rear face of latch plate 100 or key plate 106, depending on whether the lug is aligned with one of the notches 102, 103 or 104 in the latch plate. However, if the lug 131 is engaged in one of the notches 102, 103 or 104 in the latch plate, thereby locking the handle 128 in one position, the handle 128 may be unlocked to permit rotation thereof by pushing it inwardly against the thrust of spring 132 so as to remove the lug 131 from the notch.

The regulator may be connected to the supply manifold 33 at the front of the gas range near the operating handles for the other burners of the range, and the tube 31 is extended through a wall of the oven to the bulb 30 which is arranged in a suitable location in the oven. When the oven is not in use, the handle 128 is in the position shown in Fig. 14, in which the disc 111 displays at the top of the casing the ear 116 bearing the word "Off." In this position of the handle and disc, the valve member 61 is maintained in the position shown in Figs. 5, 6 and 7, in which the outlet ports 65 and 65' for supplying the burners are closed and the passage 85 for supplying the pilot is cut off from its supply passage 83. However, gas is supplied to the main chamber 32' in the casing from manifold 33 by way of passage 57, chamber 58, passages 77 (Fig. 4) and 73—75, and both of the passages 80 and 71—70. Also, since the bellows 35 is expanded by spring 42 when the oven is cold, the valve 51 will be held open by lever 48 to admit gas into the casing through the seat 52. Accordingly, when the handle 128 is turned clockwise through an angle of 90° from the position shown in Fig. 14, gas from the main chamber 32' will pass immediately through opening 64 in the valve member 61 and into outlet port 65, with which opening 64 will now align, whereby one of the burners will be supplied with gas. It will be apparent that when the handle 128 has been rotated through 90° from its "off" position, the disc 111 which is rotated with it to turn valve 61, will display at the top of the casing the ear 116 bearing the word "Low," indicating that one of the burners is connected to the gas supply.

When the valve member 61 is in its "low" position, the slot 82 therein connects passage 83 with the auxiliary passage 85, whereby gas will flow from by-pass passage 73 through passage 75 to the pilot burner. Gas will also be supplied to the main chamber 32' in the casing from by-pass passage 73 by way of transverse passage 80, and accordingly a minimum flame will be maintained on the burner supplied by outlet port 65 regardless of the position of the thermostatically operated valve 51. The rate of flow of by-pass gas through transverse passage 80 into the casing and accordingly the size of the minimum flame may be regulated by the adjusting screw 79 (Fig. 2). When the oven is heated to a certain temperature by the burner supplied by outlet port 65, the bellows 35 will adjust valve 51 so as to maintain a substantially constant temperature in the oven depending on the position of nut 44 as determined by the setting of dial 118.

In rotating the handle 128 from the "off" position to the "low" position, the ears 113 and 113' on disc 111 are moved clockwise with the disc through an angle of 90° from the position shown in Fig. 15. Since the angular position which the dial 118 may assume relative to the casing is limited by the position of ears 113, 113', the dial will now display a different portion of its periphery at the top of the casing. The portion of the periphery 125 which may now be seen at the top of the casing is that corresponding to a relatively low temperature in the oven, as for example, the graduations running from "200" to "375." The ears 113 and 113' permit rotation of the dial 118 from a position in which the lowest graduation "200" is beneath the point of the "low" ear 116 to a position in which the graduation "375" is beneath the "low" ear. When the graduation "200" is beneath the point of the "low" ear 116, the nut 44 will be set on the threaded shaft 43 for a minimum temperature which will be maintained substantially entirely by by-pass gas flowing through passage 80, the thermostatically operated valve 51 being closed or nearly closed, depending on the calibration of the regulator. When the dial 118 is rotated clockwise so far as ear 113 permits to bring the graduation "375" under the point of the "low" ear, the nut 44 will be in a position in which the bellows 35 and its associated parts will control valve 51 to maintain a corresponding temperature in the oven.

When it is desired to obtain a higher temperature in the oven, the handle 128 is rotated clockwise an additional 90° to move valve 61 to a position in which opening 64 therein aligns with passage 65' and opening 64' therein aligns with passage 65, whereby both of the oven burners are connected to the main chamber 32' in the casing. The burner which is now fed by outlet port 65' will be lit automatically by the pilot burner, since the pilot light is still maintained by by-pass gas flowing through slot 82 in the valve member to the auxiliary passage 85. The opening 70 (Fig. 6) in the valve member 61 is now aligned with passage 71' communicating with by-pass passage 73', and therefore by-pass gas will be supplied to main chamber 32' from by-pass passage 73' as well as from by-pass passage 73. Accordingly, in the event that the thermostatic valve 51 is closed, a greater supply of by-pass gas will be available for the burners than was available when the valve 61 was in the "low" position. This is a desirable feature, since the amount of by-pass gas necessary to maintain a minimum flame on both of the burners is considerably greater than that necessary for maintaining a minimum flame on only one burner.

It will be apparent by reference to Figs. 6 and 13 that as the valve member 61 is rotated clockwise from the "low" position to connect both burners to the gas supply, the opening 64 will admit gas to the outlet port 65' before the opening 70 is in alignment with passage 71'. Unless suitable provision were made, both burners would then be supplied with by-pass gas only through passage 80, and the gas thus supplied would not be sufficient for safe minimum flame. To avoid this possibility, I provide the opening 70' in the valve member 61 which acts as a booster when the valve member is in its intermediate position shown in Fig. 13. That is, when the valve member 61 is in its intermediate position, the opening 70' (Fig. 6) is in alignment with passage 71 in the casing, whereby gas from by-pass passage 73 is admitted to the bore 62 in the valve member. This additional gas admitted to the bore 62 momentarily increases the pressure therein sufficiently to assure proper ignition of both burners until additional by-pass gas is admitted upon alignment of opening 70 with passage 71'.

In turning the handle 128 clockwise from the "low" position to the position for supplying both burners, the disc 111 is rotated therewith so that the ear 116 bearing the word "High" appears at the top of the casing, indicating that both of the oven burners are supplied with gas. Also, when the disc 111 is rotated to its "high" position, the ears 113 and 113' thereon are moved clockwise an additional 90° so as to limit the dial 118 to positions in which a different portion of its periphery appears at the top of the casing. The portion of the periphery 125 which now appears at the top of the casing corresponds to a relatively high temperature in the oven. That is, the ears 113 and 113' in their new positions limit the rotation of dial 118 between a position in which the graduation "375" is beneath the "high" ear 116 and a position in which the graduation "550" is beneath the "high" ear. Rotation of the dial 118 within these limits adjusts the nut 44 on threaded rod 43 so that the bellows 35 and valve 51 maintain a temperature in the oven corresponding to the reading on the scale 125 beneath the "high" ear 116.

The handle 128 is confined within the "high" and "off" positions by the ears 102' and 104' adjacent the notches 102 and 104, respectively, on the latch plate 100. These ears are arranged to engage the lug 131 on arm 130 when the handle is in either its "off" or its "high" position and thereby secure the handle against rotation beyond these positions. When the valve member 61 is in any one of its "off," "low" or "high" positions, the lug 131 is disposed in the corresponding notch 102, 103 or 104, respectively, in the latch plate 100 and is prevented from passing through the notch by the key plate 106 on the latch plate. If it is desired to remove the operating parts for the shaft 60 and valve 61, the key plate 106 is rotated in a counter-clockwise direction on latch plate 100 to the position shown in Fig. 20. In this position of the key plate, the notch 106' therein is in alignment with notch 102 in the latch plate. Accordingly, when the handle 128 is rotated to the "off" position wherein lug 131 is opposite the aligned notches 102 and 106', the arms of the handle may be withdrawn from the slots 114 and 115 in disc 111 to permit removal of the handle. The dial 118 and disc 111 may then be moved off the threaded end of shaft 60. In assembling the parts, the arm bearing lug 131 must always be inserted through slot 115 in the disc 111 and through notch 102 in the latch plate 100, and therefore the parts will always be assembled in such a way that the "off" ear 116 on the disc is in its proper position at the top of the casing when valve member 61 is in the position for closing both of the outlet ports 65 and 65'.

The regulator may be conveniently calibrated by loosening the screw 121 and rotating the dial 118 and collar 120 on the sleeve 119. Once the dial has been fixed in the proper position on sleeve 119, it must always be assembled in the same fixed position with respect to its shaft 60 by reason of the tongue and groove connection 123, 124 between the sleeve and shaft. If for any reason it is desired to rotate the dial 118 beyond the limits fixed by the ears 113, 113' after the parts are assembled, this may be done by first drawing the dial forwardly against the thrust of the yielding collar 133 until the web 127 on the dial clears the ears 113, 113'.

In the operation of gas ranges, it is desirable that the flue area of the oven be sufficiently great to accommodate the flame of the oven burner or burners. However, in order to obtain a high thermal efficiency, the flue area should not be excessive. That is, a single burner operating normally should have about one-half the flue area required for two similar burners. In the form of the new regulator shown in Figs. 23 to 26, inclusive, I have provided means for automatically controlling the damper for the oven burners in accordance with the number or capacity of the burners that are in operation. As shown in Fig. 23, the disc 111 has a cam plate 135 mounted on the rear face thereof. The cam plate 135 extends rearwardly and then outwardly from the disc 111 and has a periphery of the form shown in Figs. 24 to 26, inclusive. A bracket 136 is secured to the bottom of casing 32 by means of bolts 137 threaded into the casing. The bracket has a horizontal leg extending to one side of the casing and a vertical leg 136' extending downwardly from the end of the horizontal leg. Pivoted to the lower end of the leg 136' is a horizontal lever 138 carrying a roller or follower 138' at its free end. A vertical arm 139 is bolted to the lever 138 intermediate the ends thereof and is connected at its upper end to a chain 140. The chain 140 leads to the operating lever of a damper for the oven burners controlled by the regulator, the damper being of any well-known construction. The damper normally tends to assume a closed position and accordingly exerts tension on the chain 140 so as to maintain the follower 138' in engagement with the periphery of cam plate 135.

When the operating handle 128 is in the "off" position (Fig. 24), the low portion 135a of the periphery of the cam plate engages the follower 138' and permits the damper to assume its normally closed position in which lever 139 is in the position shown in Fig. 23. However, when the handle 128 is rotated clockwise through an angle of 90° to the "low" position (Fig. 25), the portion 135b of the cam plate 135 rides against the follower 138', thereby forcing the arm 138 downwardly around its pivot and moving the upper end of arm 139 to the left, as seen in Fig. 23, so as to open the damper about one-half way. When the handle 128 is rotated an additional 90° to the "high" position, the high portion 135c of the cam plate engages the follower 138' and moves the follower to the position shown in dotted lines in Fig. 23. In this position of the follower, the upper end of the lever 139 is held further to the left as seen in Fig. 23, so that the damper is wide open.

With this construction, I provide means for automatically securing a plurality of positions of the outlet damper so as to accommodate a plurality of burners which may be used singly or in combination. Accordingly, the oven controlled by the new regulator may be operated at a high thermal efficiency. It will be apparent that where more than two burners are employed in the oven, the handle 128 will have an additional operating position for each additional burner, and the cam plate 135 will be arranged to move the damper to various positions corresponding in number to the number of operating positions of handle 128. When the handle 128 is moved to its "off" position after the oven is heated, the cam plate 135 will permit the damper to close, whereby the oven will operate as a fireless cooker.

I claim:

1. A regulator for two or more gas burners which comprises a casing having an inlet opening for admission of gas, a thermo-responsive valve for controlling the passage of gas through the inlet opening, a plurality of outlet ports in the casing for connection to the burners, valve means in the casing for selectively connecting one or more of the outlet ports to the interior of the casing, means in the casing for adjusting the thermo-responsive valve, an operating device for each of said adjustment and valve means, and means for interlocking said operating devices to limit the operation of the adjustment means to a predetermined temperature range when said valve means is in one position and to a different temperature range when the valve means is in another position.

2. A regulator for two or more gas burners which comprises a casing having an inlet opening for admission of gas, a thermo-responsive valve for controlling the passage of gas through the inlet opening, a plurality of outlet ports in the casing for connection to the burners, a rotatable valve member in the casing for selectively connecting one or more of the outlet ports to the interior of the casing, means extending through the valve member for adjusting said thermo-responsive valve, a temperature adjustment handle operatively connected to said adjustment means, a handle for said valve member, and means for interlocking said handles to limit rotation of the temperature adjustment handle to a predetermined temperature range when said second handle is in one position and to a different temperature range when said second handle is in another position.

3. A regulator for two or more gas burners which comprises a casing having an inlet opening for admission of gas, a thermo-responsive valve for controlling the passage of gas through the inlet opening, a plurality of outlet ports in the casing for connection to the burners, a rotatable valve member in the casing for selectively connecting one or more of the outlet ports to the interior of the casing, a shaft extending through the valve member for adjusting said thermo-responsive valve, an indicating member rotatable with the valve member and having a plurality of indexes thereon for indicating different positions of the valve member, a dial mounted on said shaft bearing temperature indicia cooperating with one of said indexes in one position of the valve member and with another of said indexes in a different position of the valve member to indicate the setting of the thermo-responsive valve, and means for rotating the valve member.

4. A regulator for two or more gas burners which comprises a casing having an inlet opening for admission of gas, a thermo-responsive valve for controlling the passage of gas through the inlet opening, a plurality of outlet ports in the casing for connection to the burners, a rotatable valve member in the casing for selectively connecting one or more of the outlet ports to the interior of the casing, a shaft extending through the valve member for adjusting said thermo-responsive valve, a disc mounted on the valve member for rotation therewith and having indicia thereon for indicating the position of the valve member, a pair of spaced projecting elements on the disc, a dial mounted on said shaft for adjusting the thermo-responsive valve and having a portion normally disposed between said elements, the dial being movable axially with respect to the disc to withdraw said portion from between the projecting elements, and means for rotating the valve member.

5. In a gas regulator for a pair of burners, a casing having a valve seat and a pair of outlet ports opening into the seat for connection to said burners, a hollow cut-off valve in the casing co-acting with the seat and rotatable in the casing to selectively connect one or both of said ports to the interior of the casing, a manually adjustable regulating valve in the casing for controlling flow through the cut-off valve and including a valve member and a seat, a duct in the casing bypassing said regulating valve for admitting gas into the casing independently of the regulating valve, a thermo-responsive element controlling the regulating valve and located in the casing beyond the inner end of the cut-off valve, adjusting means extending through the cut-off valve generally parallel to the axis thereof, the adjusting means being mounted for rotation independently of the cut-off valve and defining with the cut-off valve a gas-way extending partly along the adjusting means, the gas-way being adapted to connect said ports with the regulating valve, a handle for turning the cut-off valve to move a part of said gas-way into and out of alignment with the ports, and an operative connection between the inner end of said adjusting means and the regulating valve to adjust the regulating valve when the adjusting means is rotated.

6. In a gas regulator for a pair of burners, a casing having a valve seat and a pair of outlet ports opening into the seat for connection to said burners, a hollow cut-off valve in the casing coacting with the seat and rotatable in the casing to selectively connect one or both of said ports to the interior of the casing, a manually adjustable regulating valve in the casing for controlling flow through the cut-off valve and including a valve member and a seat, a duct in the casing bypassing said regulating valve for admitting gas into the casing independently of the regulating valve, a thermo-responsive element controlling the regulating valve and located in the casing beyond the inner end of the cut-off valve, means in the casing for bypassing gas around said regulating valve to the interior of the casing at a certain rate when only one outlet port is connected to the interior of the casing and at a greater rate when more than one outlet port is connected to the interior of the casing, adjusting means extending through the cut-off valve generally parallel to the axis thereof, the adjusting means being mounted for rotation independently of the cut-off valve and defining with the cut-off valve a gas-way extending partly along the adjusting means, the gas-way being adapted to connect said ports with the regulating valve, a handle for turning the cut-off valve to move a part of said gas-way into and out of alignment with the ports, and an operative connection between the inner end of said adjusting means and regulating valve to adjust the regulating valve when the adjusting means is rotated.

7. In a gas regulator for a pair of burners, a casing having a valve seat and a pair of outlet ports opening into the seat for connection to said burners, a hollow cut-off valve in the casing coacting with the seat and rotatable in the casing to selectively connect one or both of said ports to the interior of the casing, a manually adjustable regulating valve in the casing for controlling flow through the cut-off valve and including a valve member and a seat, a duct in the casing bypassing said regulating valve for admitting gas into the casing independently of the regulating valve, a thermo-responsive element controlling the regulating valve and located in the casing beyond the inner end of the cut-off valve, means in the casing controlled by the cut-off valve for bypassing the gas around said regulating valve to the interior of the casing at a certain rate when only one outlet port is connected to the interior of the casing and at a greater rate when more than one outlet port is connected to the interior of the casing, adjusting means extending through the cut-off valve generally parallel to the axis thereof, the adjusting means being mounted for rotation independently of the cut-off valve and defining with the cut-off valve a gas-way extending partly along the adjusting means, the gas-way being adapted to connect said ports with the regulating valve, a handle for turning the cut-off valve to move a part of said gas-way into and out of alignment with the ports, and an operative connection between the inner end of said adjusting means and regulating valve to adjust the regulating valve when the adjusting means is rotated.

8. In a gas regulator for a pair of burners, a casing having a valve seat and a pair of outlet ports opening into the seat for connection to said burners, a hollow cut-off valve in the casing coacting with the seat and rotatable in the casing to selectively connect one or both of said ports to the interior of the casing, a manually adjustable regulating valve in the casing for controlling flow through the cut-off valve and including a valve member and a seat, a duct in the casing bypassing said regulating valve for admitting gas into the casing independently of the regulating valve, a thermo-responsive element controlling the regulating valve and located in the casing beyond the inner end of the cut-off valve, a pair of bypass passages in the casing, means for supplying said passages with gas independently of said cut-off valve and said regulating valve, means for connecting only one of said passages to the interior of the casing when one of the outlet ports is connected to the interior of the casing and for connecting both of the passages to the interior of the casing when both outlet ports are connected to the interior of the casing, adjusting means extending through the cut-off valve generally parallel to the axis thereof, the adjusting means being mounted for rotation independently of the cut-off valve and defining with the cut-off valve a gas-way extending partly along the adjusting means, the gas-way being adapted to connect said ports with the regulating valve, a handle for turning the cut-off valve to move a part of said gas-way into and out of alignment with the ports, and an operative connection between the inner end of said adjusting means and regulating valve to adjust the regulating valve when the adjusting means is rotated.

BENSON F. WADDELL.